United States Patent
Brown et al.

(10) Patent No.: US 6,448,673 B1
(45) Date of Patent: Sep. 10, 2002

(54) CONTROLLED HIGH SPEED RECIPROCATING ANGULAR MOTION ACTUATOR

(75) Inventors: David C. Brown, Northborough; Michael B. Nussbaum, Newton; Felix Stukalin, Framingham, all of MA (US)

(73) Assignee: GSI Lumonics, Corporation, Billerica, MA (US)

(*) Notice: Subject to any disclaimer, the term of this patent is extended or adjusted under 35 U.S.C. 154(b) by 0 days.

(21) Appl. No.: 09/872,711

(22) Filed: Jun. 1, 2001

Related U.S. Application Data
(60) Provisional application No. 60/208,611, filed on Jun. 1, 2000.

(51) Int. Cl.[7] ............................. G06K 7/10; H02K 33/18
(52) U.S. Cl. ..................... 310/17; 335/274; 359/198; 359/199; 318/114; 235/462.32; 310/29
(58) Field of Search ............................. 310/15, 17, 29, 310/36; 335/229, 230, 266, 267, 272, 274; 235/462.01, 462.32, 472.01; 359/198, 199, 200; 318/114, 119, 127, 128

(56) References Cited

U.S. PATENT DOCUMENTS

| | | | |
|---|---|---|---|
| 3,609,485 A | 9/1971 | Dostal | 318/132 |
| 3,642,344 A | 2/1972 | Corker | 359/214 |
| 3,678,308 A | 7/1972 | Howe | 310/36 |
| 4,600,910 A | 7/1986 | Vanderlaan | 335/229 |
| 4,958,894 A | 9/1990 | Khowles | 359/213 |
| 5,066,084 A | 11/1991 | Culp | 359/213 |
| 5,280,377 A | 1/1994 | Chandler et al. | 359/196 |
| 5,424,632 A | 6/1995 | Montagu | 324/146 |
| 5,559,319 A | * 9/1996 | Peng | 235/462.36 |
| 6,304,359 B1 | * 10/2001 | Gadhok | 359/198 |

OTHER PUBLICATIONS

PCT International Search Report dated Oct. 30, 2001 of International Application No. PCT/US01/17665 filed Jun. 1, 2001.

\* cited by examiner

*Primary Examiner*—Nestor Ramirez
*Assistant Examiner*—Judson H. Jones
(74) *Attorney, Agent, or Firm*—Antonelli, Terry, Stout & Kraus, LLP

(57) ABSTRACT

A reciprocating rotary action actuator consisting of a rotor and stator that can be added to a bi-directional rotary motor or galvanometer scanner, where the stator has a ring magnet and a pair of soft iron pole pieces that concentrate the flux of the ring magnet into a concentric set of narrow, uniformly spaced, axially oriented, magnetic flux fields intersecting the rotor's field of travel. The rotor has small permanent magnets embedded in the periphery of a nonconductive, nonmagnetic rotor core. The rotor magnets have the same number and spacing as the stator's magnetic flux fields. The magnet poles are oriented opposite the flux fields of the stator pole pieces, so that upon rotation, the rotor magnets encounter the stator flux fields at each end of rotor travel, creating an opposing force that reverses the angular direction of the rotor with minimal requirement for actuator current and generation of thermal losses.

40 Claims, 6 Drawing Sheets

CONTROLLED HIGH SPEED RECIPROCATING ANGULAR MOTION ACTUATOR

This application relates and claims priority for all purposes to pending U.S. application Ser. No. 60/208,611, filed June 1, 2000.

BACKGROUND OF THE INVENTION

1. Technical Field of the Invention

This invention relates to electromechanical reciprocating rotary motion devices; and in particular to reciprocating angular motion actuators for producing constant amplitude, variable frequency, substantially triangular waveform motion profiles suitable for optical scanning applications.

2. BackGround Art

The use of an oscillating mirror and associated motor assembly is well known in the art for effecting a beam sweeping action. A characteristic of such devices, whether the motor producing the oscillation is a stepper motor or a galvanometer type motor, as is commonly the case, force, generated by current flowing through the motor windings must be used to decelerate the scanning motion and then reverse it. This necessarily generates heat, which is a significant problem in a very small device such as a galvanometer scanner. This heating, for a sinusoidal scan waveform, is proportional to the fourth power of scan frequency, and the square of the scan angle.

$$\text{position}: \theta \sin \omega t$$

$$\text{velocity}: \omega \theta \sin \omega t$$

$$\text{accelleration}: -\omega^2 \theta \sin \omega t = \frac{\tau}{j}$$

$$\tau = i K_2$$

$$\therefore i = \frac{\omega^2 \theta j}{K_2}$$

$$P = i^2 R$$

$$T = T_{case} + R_{th} \left( \frac{\omega^2 \theta j}{K_t} \right)^2 R_{coil}$$

Many mechanical schemes have been employed to reduce the motor current and associated heat problem.

In Khowles U.S. Pat. No. 4,958,894, the excitation of an electromagnetic coil operating on a magnet at the end of a pivot arm extending off the mirror, is coordinated with the end-of-travel engagement of the magnet with one or the other of two resilient bumpers between which it travels, imparting a reversing bounce and resulting in the oscillation of the pivot arm and mirror. This bumper variation produces a faster reversal and lowers the required energy.

In Culp's U.S. Pat. No. 5,066,084, there is disclosed a constant velocity scanning apparatus in which the mirror oscillations are maintained with end-of-travel piezo motion actuators in combination with end-of-travel, resilient "energy absorbing and releasing contacts" analogous to the rubber bumpers of Khowles. Howe's U.S. Pat. No. 3,678,308, illustrates another variation on an oscillating scanner that employs mechanical springs to provide an end-of-travel bounce in the oscillating motion of the mirror.

These all involve scanning systems with mechanical springs defining the end of travel, and demonstrate well the general idea that opposing springs can be employed to conserve energy within a mechanically oscillating device. They use varying geometries and may also use modified motor drive current schemes for a coordinated effect on reducing average motor current while maintaining a satisfactory output waveform of the device.

It is instructive to look at U.S. Pat. No. 5,424,632, as illustrative of a common moving magnet scanner. The '632 FIG. 1 is described as a schematic view of a galvanometer used in a laser scanning system, illustrating the mirror, motor, and a position transducer. In the '632 FIG. 2, torque motor 17 includes a magnetically permeable outer housing 28 that holds the stator 51 consisting of windings 31 on bobbin 50. Permanent magnet rotor 100 is rotably mounted within the stator. Stator windings 31 in the '632 FIGS. 3 and 8 is the coil where the heat of concern is generated. This heat is dissipated radially through the device.

The achievable flux density of the stator magnet 27 as well as the resistivity of winding 31 are subject to fundamental material constraints. The achievable acceleration of this system is a function of the aspect ratio of the magnet (length to diameter) and proportional to 1/(magnet radius), to first order. This means that larger structures allow lower RMS (root mean square) acceleration. RMS acceleration is defined over the relevant thermal time constants. In other words, it is the maximum acceleration at which the device can be run without heat-induced damage and eventual failure. In theory, one can put an arbitrarily large stator current, ignoring demagnetizing of the magnet, for an arbitrarily short time, but when attempting to execute a repetitive waveform, the device would simply reach a certain steady state. FIGS. 1 and 2 of the '632 disclosure are included herein as prior art FIGS. 9 and 10 respectively.

Another area of art which readers may find instructive is that of resonant scanners. These scanners use a more or less linear spring, and constitute a mechanical oscillator in which energy is continually converted back and forth between kinetic energy (stored in the rotating mass) and potential energy (stored in a torsional spring). These can achieve very high efficiencies, as the motor only has to supply system losses, but they have two fundamental constraints. First, the frequency is constrained to the resonant frequency of the system. The frequency can be tuned, to some extent, such as by changing the temperature of the spring or making other mechanical adjustments to the design. There are patents to this effect. Second, the mechanical output motion must be sinusoidal, or very nearly so.

Dostal's U.S. Pat. No. 3,609,485, is a resonant torsional oscillator for optical scanning or other vibratory action at a high amplitude and constant rate. This patent is cited in many torsional resonant scanners, an example of which is Corker's U.S. Pat. No. 3,642,344, Optical Scanner Having High Frequency Torsional Oscillator. The problem with all of the resonant torsional oscillators is that they give sinusoidal motion, and are essentially constant frequency devices, being tunable over a narrow range by varying temperature or otherwise varying the spring rate of the spring.

In summary, there remains room for improvement in the design and operation of bi-directional reciprocating galvanometer scanners and similar reciprocating motion devices to reduce power requirements and minimize heat generation through the use of design features that provide for passive energy conservation in the change of direction phase of motion.

SUMMARY OF THE INVENTION

The invention may be most simply described as a reciprocating rotary action actuator consisting of a motor coupled to a rotor and stator where the stator has a ring magnet and a pair of soft iron pole pieces that concentrate the flux of the ring magnet into a concentric set of narrow, uniformly spaced, axially oriented, magnetic flux fields intersecting the rotor's field of travel. The rotor has small permanent magnets embedded in the periphery of a nonconductive, non-magnetic rotor core, where the magnets are of the same number and spacing as the stator's magnetic flux fields, there being at least one and preferably two or more with equal spacing. The magnets are pole oriented axially opposite the flux fields of the stator pole pieces, so that upon rotation, the rotor magnets encounter the stator flux fields at each end of rotor travel, creating an opposing force that reverses the angular direction of the rotor with minimal requirement for motor current. The device can be incorporated into a galvanometer scanner or other devices with similar reciprocating rotary action requirements.

More particularly, the invention encompasses a high speed reciprocating angular motion device, adaptable to electrically powered optical scanning and other applications where frequency, amplitude, load moment of inertia, and scan efficiency are generally limited by thermal considerations of the actuator. The limitations of the prior art are overcome by combining a bi-directional, electrical drive actuator for driving a reciprocating scanner rotor with high efficiency, while a preferably passive, energy transformation mechanism, the equivalent of a set of hi-K (spring constant) bumpers or springs, provides for decelerating, reversing and re-accelerating the rotor motion at each end of its arc of rotation. The passive reversing function is enabled magnetically, and may be modified in some embodiments to provide limited adjustment for tuning and matching of spring set characteristics.

The design is a radical departure from the prior art of scanner actuators. The design calculations for a device of the invention having the required passive or near passive ability for repeatedly reversing the rotor, motor and design load direction, and executing these acceleration changes within a specified small portion of the rotor arc of travel, with substantially little contribution from motor current or impact on thermal budget, are not trivial. However, it should pose no special problem for those skilled in the art, upon a full and careful reading and understanding of this disclosure and its priority document, which is hereby incorporated by reference.

The motion waveform of the device may be constrained to be triangular rather than sinusoidal. A triangular scan waveform is more useful in many cases, as the largely constant velocity aspect of the rotor motion is often easier to incorporate into component and system designs, and offers efficiencies over a sinusoidal scan. The frequency of the reciprocating motion is not constrained by the invention. What is constrained by the particular design of any embodiment is amplitude, the useful arc distance of rotor motion—this is a substantially constant amplitude system whose frequency can be varied at will.

Other objects and advantages of the present invention will become readily apparent to those skilled in this art from the following detailed description, wherein we have shown and described only a preferred embodiment of the invention, simply by way of illustration of the best mode contemplated by us on carrying out our invention.

DESCRIPTION OF THE PREFERRED EMBODIMENT

The invention is susceptible of many embodiments. The preferred embodiment or best mode for using the invention described and illustrated herein is in no way limiting of the scope of the invention, as will be readily evident to those skilled in the art.

Figure 1:
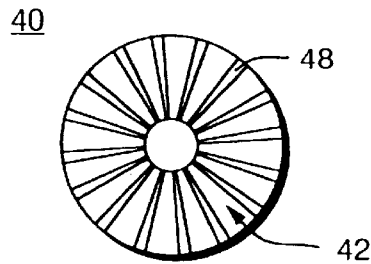
FIG. 1 is a plan view diagram of the stator structure of a preferred embodiment, illustrating the radially inward projecting teeth that define the radial spacing of the end-of-travel flux field "bumpers" for reversing the rotation of a similarly sectioned rotor.
Figure 2:
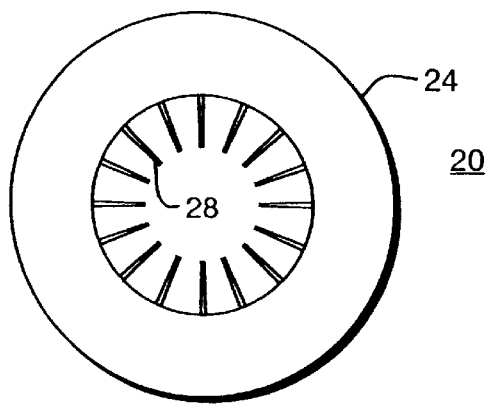
FIG. 2 is a plan view diagram of the rotor of the embodiment cited in FIG. 1, the permanent magnet wedges with opposing pole orientation interspersed with non-magnetic material rotor core sections providing the magnetic bounce when they encounter the respective bumpers of the stator of FIG. 1.
Figure 3:
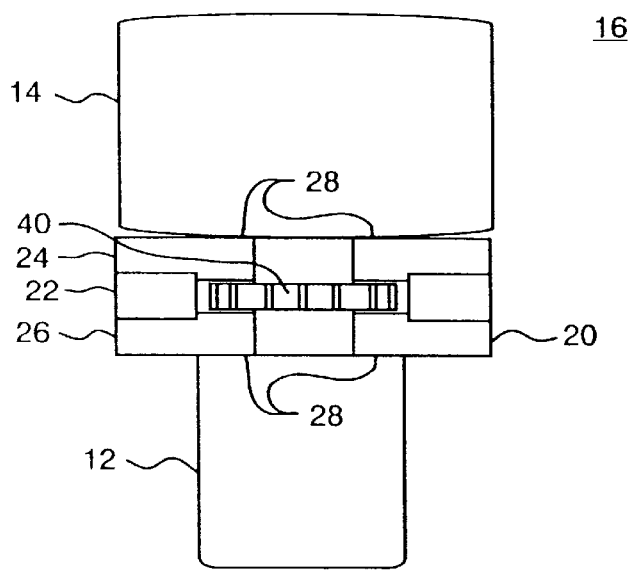
FIG. 3 is a partially cut-away side elevation diagram of a galvanometer of the invention, illustrating the sectioned rotor of FIG. 2 mounted within the upper and lower pole pieces of the stator of FIG. 1.

Referring to FIGS. 1–3, a preferred embodiment device in the form of a galvanometer scanner 10 consists of a stator assembly 20 and a rotor assembly 40, mounted between the scanner motor 12 and the mirror 14.

Referring to FIGS. 2–5, stator assembly 20 is fixed with respect to the stator of motor 12. Rotor assembly 40 is rigidly affixed to the output shaft of scanner motor 12, and rotates with mirror 14 and the scanner motor 12 rotor. Stator assembly 20 consists of a ring magnet 22, and a pair of soft iron pole pieces 24 and 26. The pole pieces serve to concentrate the flux of the ring magnet into a matched north/south pole set of radially inwardly extending upper and lower axial stator teeth 28. In this embodiment, stator assembly 20 is configured with 16 sets of upper and lower teeth 28, or magnetic pole sets, spaced symmetrically every 22.5 degrees about the stator, each wedge 28 subtending 2.5 degrees.

Figure 4:
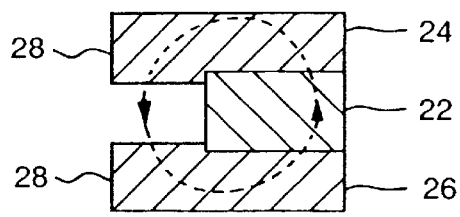
FIG. 4 is a side elevation cross section close-up diagram of a pair of stator teeth of the stator of FIG. 1, illustrating the magnetic circuit associated with the stator magnet, with the rotor assumed to be in a non-interfering mid range of arc of travel position.
Figure 5:
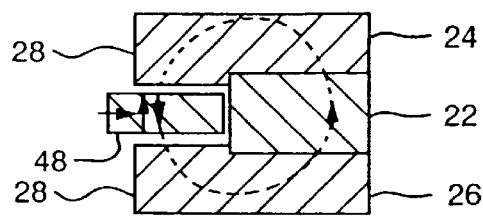
FIG. 5 is side elevation cross section close-up diagram of the stator teeth and magnetic circuit of FIG. 4, but with the rotor having advanced to end-of-travel where a permanent magnetic wedge section has encountered the stator magnetic circuit, the opposing magnetic forces illustrated by the opposing arrows.

Referring now to FIG. 4, there is shown a partial cross section view of the stator ring magnet 22 and pole pieces 24 and 26, and the magnetic circuit associated with each upper and lower tooth set. Referring to FIGS. 1, 3, and 5, rotor assembly 40 incorporates a set of wedge shaped permanent magnets 48, radially dispersed in a nonconductive, nonmagnetic structure 42. Rotor wedge magnets 48 have the same spacing and number as the stator teeth 28, but are pole oriented so as to provide a magnetic flux path aligned opposite that of the stator teeth 28.

Figure 9:
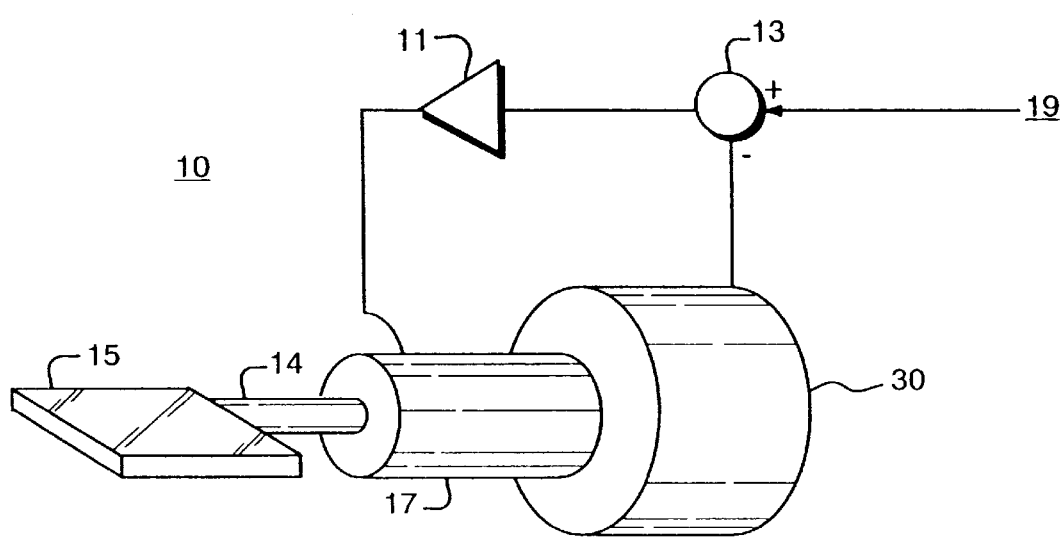
FIG. 9 is a prior art schematic view of a galvanometer, mirror and position detector as applied in a laser scanning system.
Figure 10:
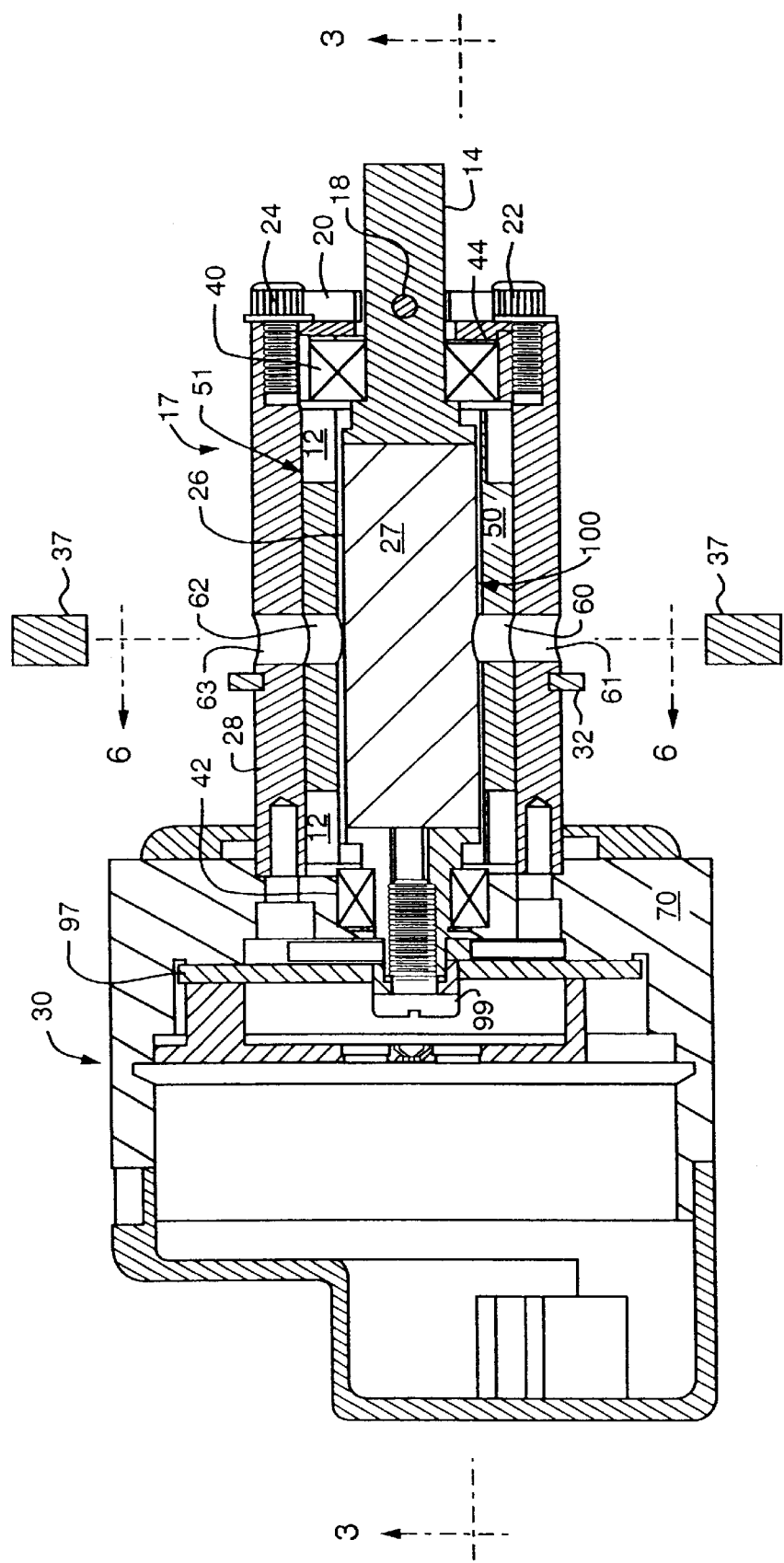
FIG. 10 is a prior art longitudinal cross-section of the prior art FIG. 9 galvanometer and position transducer.

Referring to FIGS. 3 and 5, when galvanometer scanner 10 is assembled, rotor 40 will occupy the axial space between upper and lower stator teeth 28. Upon rotation, when individual rotor magnets 48 closely approach alignment with respective upper and lower stator teeth 28, an opposing electromagnetic 'spring' force will be generated between the opposing flux fields. These opposing magnetic fields create a circumferential spring force, symmetrically applied around the rotor axis without bearing bias, which will attempt to repel and reverse the rotation of the rotor until its magnets 48 are repelled from the gap defined by the upper and lower stator teeth. For this particular spacing of teeth 28 and magnets 48, ignoring fringing effects, there are about 20 degrees of free rotor motion available to the system in between the effective zones of magnetic spring action. This is the arc of bi-directional linear motion available to the device of this embodiment. This embodiment is particularly suited for combination with a bi-directional motor and position detector similar to the FIG. 9 device, as a galvanometer for a scanning system.

It will be readily apparent to those skilled in the art that the total arc length or degrees of rotation is a function of the number of teeth and wedge sets, or magnetic poles; being specifically 360 degrees divided by the number of pole sets. While one set of stator teeth and matching rotor wedge opposing poles would theoretically provide a 360 degree arc of reciprocating motion, having at least two pole sets provides balance to the reversing mechanism. Also, more poles provide more "bounce" capability so that the percentage of arc travel consumed by the change of acceleration is smaller, leaving a larger percentage of arc for useful, bi-directional, linear motion.

Figure 6:
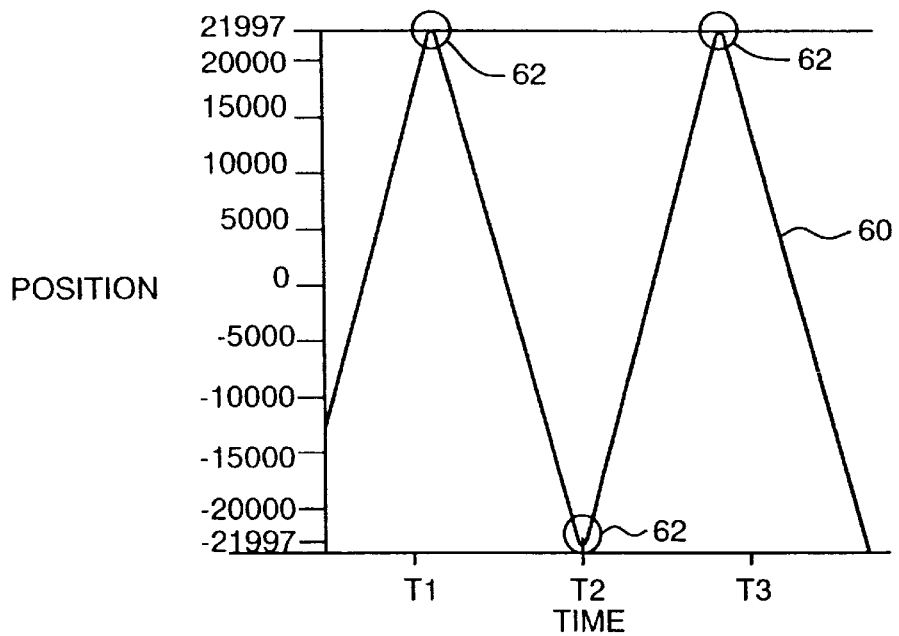
FIG. 6 is a position versus time graph of the rotor for two cycles of oscillation, illustrating the uniformly triangular waveform with substantially linear rotational velocity except near the end-of-travel deceleration/acceleration action.
Figure 7:
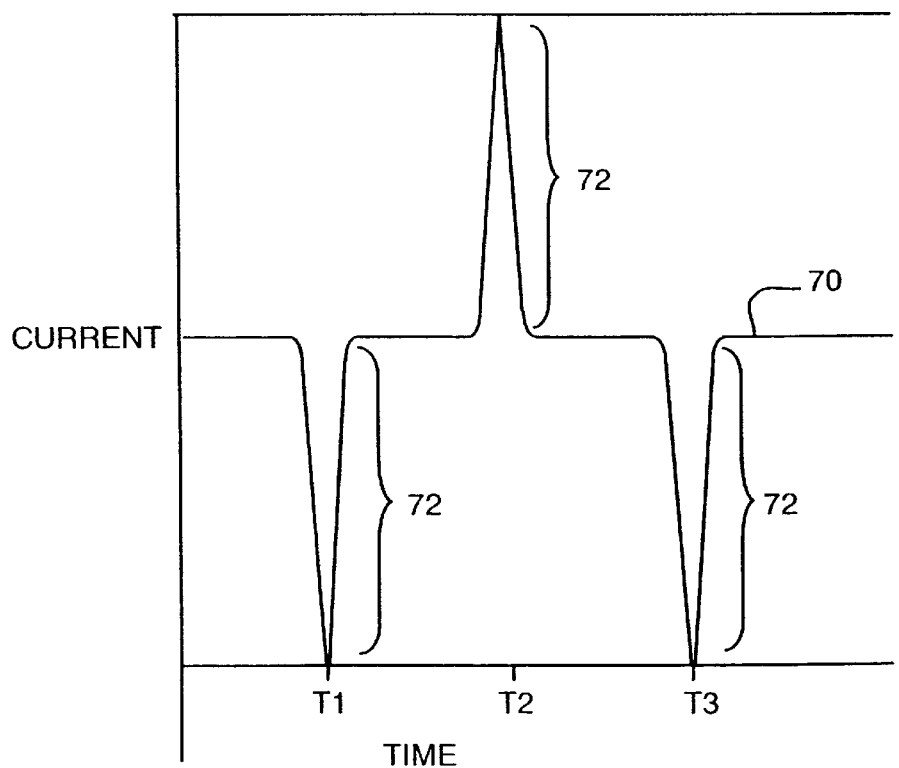
FIG. 7 is a scanner current versus time graph for a prior art scanner with a similar rotor motion waveform as the FIG. 6 graph, illustrating the high current requirement for the deceleration/acceleration action at the rotor end-of-travel position.
Figure 8:
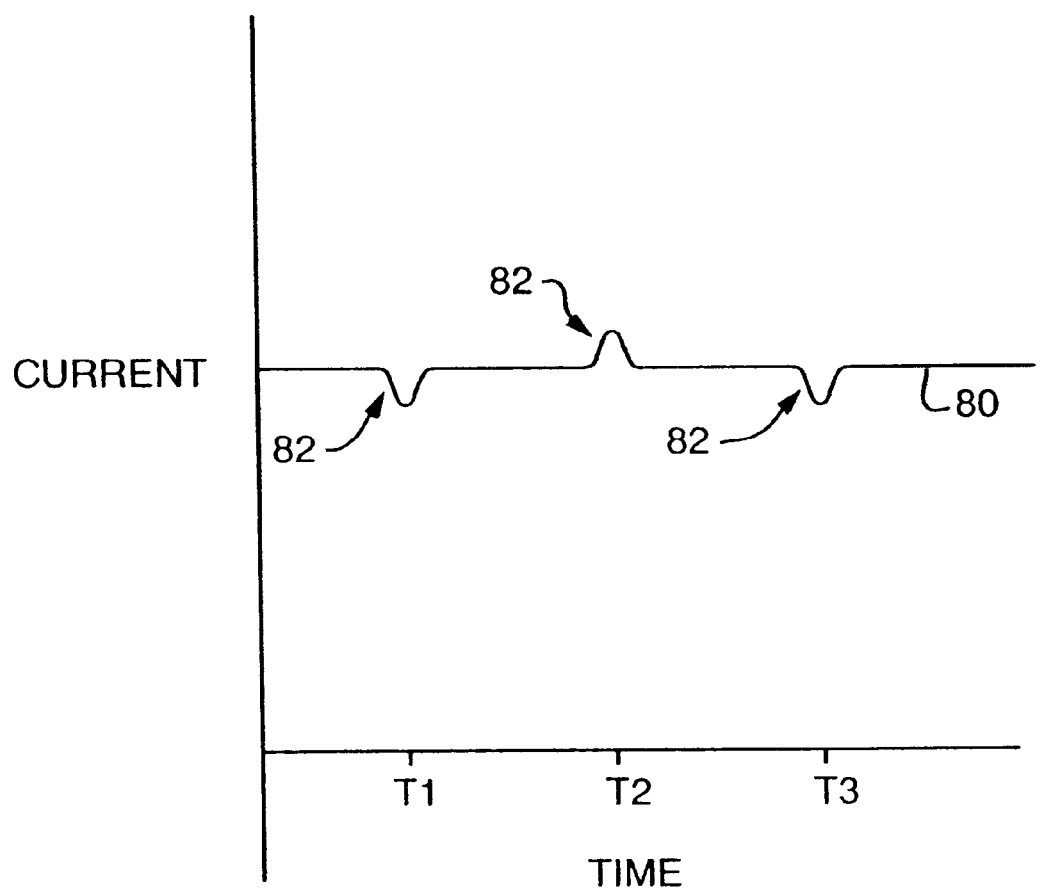
FIG. 8 is a scanner current versus time graph for the preferred embodiment scanner, illustrating the substantially lower peak current requirement of the invention, relative to the FIG. 7 prior art scanner.

Referring to FIGS. 6–8, the performance of the device is depicted in two of three of these graphs. FIG. 6 shows a typical triangular scan position waveform 60, with a relatively high scan efficiency, where the acceleration and deceleration at either end occupy a small portion 62 of the active scan cycle.

Referring now to FIG. 7, there is illustrated the resulting scanner current 70, proportional to acceleration, of a prior art device without the magnetic spring feature of the invention. Scanner current 70 can readily be seen to sharply increase at 72 to accomplish the deceleration and acceleration of the rotor reversal. Motor heating is proportional to the square of this current, and is thus significantly affected by this current profile.

Referring now to FIG. 8, there is shown the resulting scanner current 80 in a device incorporating the invention, where a substantially lower motor current peak 82, in the order of a 10× reduction over the current peak 72 of the FIG. 7 device, due to the magnetic spring energy conservation feature. As will be readily apparent to those skilled in the art, heating due to electrical current is reduced to in the order of 1/100 of its FIG. 7 value.

Figure 11:
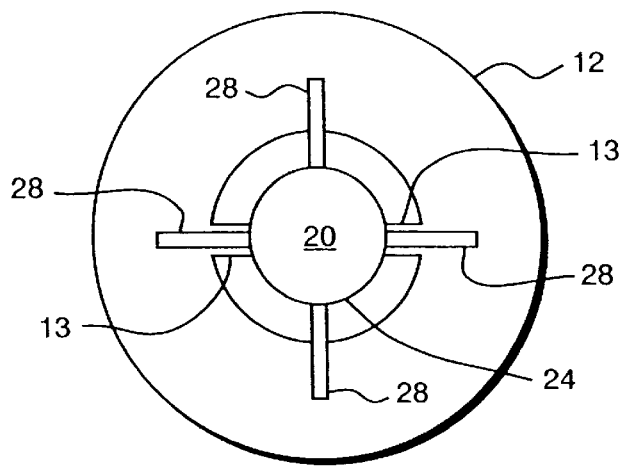
FIG. 11 is an end view of a core stator embodiment of the invention, showing the two opposing mounting stanchions between the motor housing and the stator core.
Figure 12:
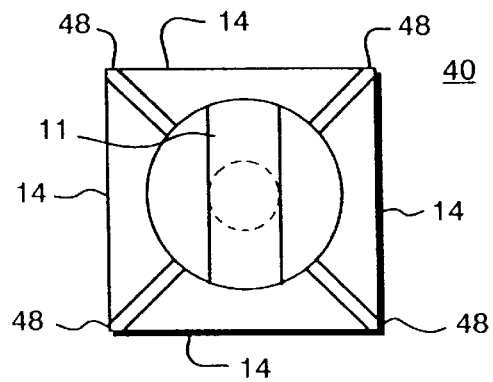
FIG. 12 is an end view of the exterior rotor and mirror assembly that mates with the core stator of FIG. 11, showing the motor shaft to rotor mounting stanchions.
Figure 13:
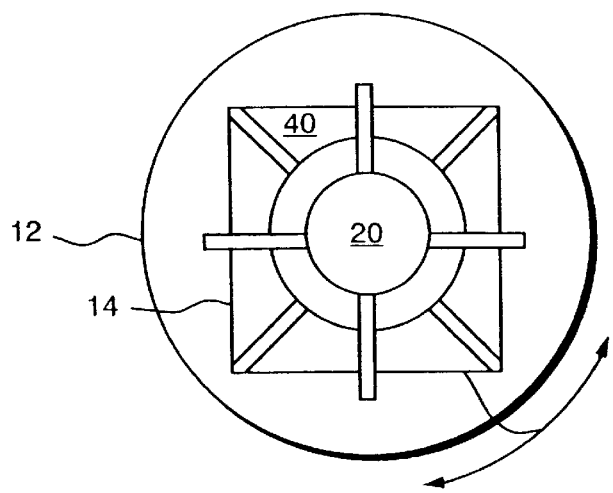
FIG. 13 is an end view of the rotor of FIG. 12 assembled with the stator of FIG. 11.

Referring to FIGS. 11–13, there is shown an alternative embodiment with a core stator and external rotor upon which mirrors are mounted. Stator core magnet 24 is configured with upper and lower outwardly projecting pole teeth 28, which provide for concentration of flux lines as described above. Stator 20 is mounted to the housing of motor 12 by open stanchions 13, permitting room for attaching external rotor assembly 40 to the shaft of motor 12 with open stanchions 11. Rotor assembly 40 has embedded rotor magnets 48 and rotates in reciprocating fashion around stator 20 within upper and lower pole teeth 28, so that magnets 48 intersect with the flux lines of teeth 28 as described in other embodiments, causing the reversal in direction of rotation. This embodiment is configured for about 90 degrees of arc or amplitude; the design being adaptable to other arc lengths as described in other embodiments, subject to mounting stanchion size and clearance requirements. The number and arrangement of mirrors 14 or other configuration of load is preferably minimal and balanced.

As will be readily apparent to those skilled in the art, the invention is susceptible of many variations of which the preferred embodiment is illustrative but not limiting. For example, there is within the scope of the invention, a device for providing fixed amplitude reciprocating angular motion to a bi-directional rotary drive mechanism and load, that consists of a stator assembly and rotor assembly. The stator assembly is configured with at least one stator magnet coupled with at least one pair of upper and lower inwardly extending pole teeth, where the pole teeth are configured for concentrating magnetic circuit flux lines induced by the magnet in a common direction between respective upper and lower teeth of each pair of teeth. While the preferred embodiment has multiple sets of teeth equally spaced about the axis of the device, a single set of teeth generating a respective set of flux lines, provides a magnetic bumper to stop the free rotation of a rotor of the invention.

The rotor assembly is sized and configured for rotation within the stator assembly between the upper and lower pole teeth. The rotor assembly has a corresponding at least one rotor magnet peripherally configured on the rotor with its magnetic poles oriented axially in opposition to the magnetic circuit flux lines of the stator so as to have the free rotation of the rotor magnetically opposed by intersection of the magnet with the opposing flux lines of the stator. In it's most minimal configuration, a rotor with one magnet working within a stator with one set of teeth will have a substantially 360 degree arc or amplitude between reversals. Of course, the stator's at least one pair of pole teeth may be two pairs of pole teeth or more. The location and spacing of these teeth pairs about the axis of the rotor, can be configured in conjunction with the location and spacing of the at least one rotor magnet, to limit the arc of rotation of the rotor to a fixed amplitude or arc of less than 360 degrees.

Of course, other design parameters make it problematic to concentrate the required repelling force into a single point of intersection as between the rotor and the stator flux lines. For that reason, the numbers of pairs of stator teeth are two or more, and the number and spacing of rotor magnets is preferably equal to the number and spacing of pairs of pole teeth, and oriented so that there are intersecting magnets and flux lines at two or more equally spaced points about the rotor. This avoids the bearing load of the single point example above. The number, location and spacing of these teeth pairs about the axis of the rotor, can be configured in conjunction with the number, location and spacing of the at least one rotor magnet, to limit the arc of rotation of the rotor to a fixed amplitude and provide the maximum number of points of intersection, thereby distributing the concentration of repelling force as much as possible.

The stator assembly magnet may be a ring magnet within which the rotor assembly operates, magnetically coupled to upper and lower pole pieces from which the upper and lower radially inwardly extending pole teeth project.

The stator assembly may be fixed with respect to the stationary reference frame of a drive or actuator mechanism or motor, with the rotor assembly attached to the rotary component of the drive mechanism. The rotor assembly may be attached to a load. The drive mechanism may be a galvanometer. The load may be reciprocating scanner mirror.

As illustrated in the preferred embodiment, there is a device for providing fixed amplitude reciprocating angular motion where the stator has sixteen pairs of equally spaced pole teeth, and the rotor has an equal number of magnets. The magnets are wedge shaped, and embedded in a nonconductive, nonmagnetic rotor core material.

As another example, there is a device for providing fixed amplitude reciprocating angular motion to a bi-directional rotary drive mechanism and load, consisting of a stator assembly configured with at least one stator magnet coupled with a multiplicity of upper and lower outwardly extending pole teeth, where the pole teeth are configured for concentrating magnetic circuit flux lines induced by the stator magnet in a common direction between respective upper and lower teeth as in the prior embodiments. The rotor assembly is sized and configured for rotation around the stator assembly between the upper and lower pole teeth, and has a corresponding multiplicity of rotor magnets configured on the rotor with poles oriented in opposition to the magnetic circuit flux lines of the stator so as to have the free rotation of the rotor magnetically opposed by intersection of the rotor magnets with the opposing flux lines of the stator. The drive mechanism may be a galvanometer. The load may be one or more mirrors mounted directly on the rotor or elsewhere attached to the rotary elements of the galvanometer. The rotor may have a multifaceted exterior to which the one or more mirrors may be attached.

In summary, the invention is a dramatic departure from the present art of optical scanners and bi-directional rotary motors generally. In a bi-directional, electrically powered rotor, magnets in the rotor, upon nearing the end limit of the rotor's range of rotation, encounter stator flux wedges which create an opposing 'spring' force that very efficiently reverse the rotation of the rotor. This significantly reduces the peak electrical load and the related thermal limitations of the actuators of the prior art, unleashing collateral opportunities for optimizing the performance of the motor in triangle wave form applications including but not limited to galvanometer scanners.

Among our claims are:

1. A device for providing fixed amplitude reciprocating angular motion to a bi-directional rotary drive mechanism and load, comprising a stator assembly configured with at least one stator magnet coupled with at least one pair of upper and lower inwardly extending pole teeth, said pole teeth configured for concentrating magnetic circuit flux lines induced by said magnet in a common direction between respective upper and lower teeth of each said pair, a rotor assembly sized and configured for rotation within said stator assembly between said upper and lower pole teeth, said rotor assembly comprising a corresponding at least one rotor magnet peripherally configured on said rotor with poles oriented in opposition to said magnetic circuit flux lines of said stator so as to have the free rotation of said rotor magnetically opposed by intersection of said magnet with opposing said flux lines of said stator.

2. A device for providing fixed amplitude reciprocating angular motion according to claim 1, said at least one pair of pole teeth being at least two pairs of pole teeth, the location and spacing of said pairs about the axis of said rotor configured in conjunction with the location and spacing of said at least one rotor magnet to limit the arc of rotation of said rotor to a fixed amplitude.

3. A device for providing fixed amplitude reciprocating angular motion according to claim 2, said pairs of pole teeth being of equal spacing about the axis of said rotor assembly.

4. A device for providing fixed amplitude reciprocating angular motion according to claim 2, said at least one rotor magnet being equal in number and spacing with said pairs of pole teeth.

5. A device for providing fixed amplitude reciprocating angular motion according to claim 2 said at least one rotor magnet being at least two rotor magnets, the spacing of said rotor magnets configured in conjunction with the spacing of said pairs of pole teeth to limit the arc of rotation of said rotor to a fixed amplitude.

6. A device for providing fixed amplitude reciprocating angular motion according to claim 5, said rotor magnets configured with equal spacing about the axis of said rotor assembly.

7. A device for providing fixed amplitude reciprocating angular motion according to claim 5, said at least two pairs of pole teeth being sixteen pairs of pole teeth.

8. A device for providing fixed amplitude reciprocating angular motion according to claim 1, said stator magnet comprising a ring magnet within which said rotor assembly operates, said at least one pair of upper and lower inwardly extending pole teeth comprising upper and lower pole pieces magnetically coupled to said ring magnet, said upper and lower pole teeth extending radially inward from respective said pole pieces.

9. A device for providing fixed amplitude reciprocating angular motion according to claim 1, said at least one rotor magnet being wedge shaped.

10. A device for providing fixed amplitude reciprocating angular motion according to claim 9, said at least one rotor magnet embedded in a nonconductive, nonmagnetic rotor core material.

11. A device for providing fixed amplitude reciprocating angular motion according to claim 1, said stator assembly fixed with respect to the stationary reference frame of a said drive mechanism, said rotor assembly being attached to the rotary component of said drive mechanism.

12. A device for providing fixed amplitude reciprocating angular motion according to claim 11, said rotor assembly attached to a position detector for determining angular position.

13. A device for providing fixed amplitude reciprocating angular motion according to claim 11, said drive mechanism being a galvanometer, said load being a reciprocating scanner mirror.

14. A fixed amplitude reciprocating angular motion drive mechanism, comprising
 a bi-directional rotary drive motor,
 a stator assembly configured with at least one stator magnet coupled with at least one pair of upper and lower inwardly extending pole teeth, said pole teeth configured for concentrating magnetic circuit flux lines induced by said magnet in a common direction between respective upper and lower teeth of each said pair, said stator attached to the housing of said motor, and
 a rotor assembly sized and configured for rotation within said stator assembly between said upper and lower pole teeth, said rotor assembly comprising a corresponding at least one rotor magnet peripherally configured on said rotor with poles oriented in opposition to said magnetic circuit flux lines of said stator so as to have the free rotation of said rotor magnetically opposed by intersection of said magnet with opposing said flux lines of said stator, said rotor being attached to the output shaft of said motor.

15. A fixed amplitude reciprocating angular motion drive mechanism according to claim 14, said at least one pair of pole teeth being at least two pairs of pole teeth, the location and spacing of said pairs about the axis of said rotor configured in conjunction with the location and spacing of said at least one rotor magnet to limit the arc of rotation of said rotor to a fixed amplitude.

16. A fixed amplitude reciprocating angular motion drive mechanism according to claim 15, said pairs of pole teeth being of equal spacing about the axis of said rotor assembly.

17. A device for providing fixed amplitude reciprocating angular motion according to claim 16, said at least one rotor magnet being equal in number and spacing with said pairs of pole teeth.

18. A device for providing fixed amplitude reciprocating angular motion according to claim 16 said at least one rotor magnet being at least two rotor magnets, the spacing of said rotor magnets configured in conjunction with the spacing of said pairs of pole teeth to limit the arc of rotation of said rotor to a fixed amplitude.

19. A device for providing fixed amplitude reciprocating angular motion according to claim 18, said rotor magnets configured with equal spacing about the axis of said rotor assembly.

20. A device for providing fixed amplitude reciprocating angular motion according to claim 19, said at least two pairs of pole teeth being sixteen pairs of pole teeth.

21. A device for providing fixed amplitude reciprocating angular motion according to claim 14, said stator magnet comprising a ring magnet within which said rotor assembly operates, said at least one pair of upper and lower inwardly extending pole teeth comprising upper and lower pole pieces magnetically coupled to said ring magnet, said upper and lower pole teeth extending radially inward from respective said pole pieces.

22. A device for providing fixed amplitude reciprocating angular motion according to claim 14, said at least one rotor magnet being wedge shaped.

23. A device for providing fixed amplitude reciprocating angular motion according to claim 22, said at least one rotor magnet embedded in a nonconductive, nonmagnetic rotor core material.

24. A device for providing fixed amplitude reciprocating angular motion according to claim 14, said rotor assembly attached to a position detector for determining angular position.

25. A device for providing fixed amplitude reciprocating angular motion according to claim 24, said device being a galvanometer, said load being a reciprocating scanner mirror.

26. A fixed amplitude reciprocating angular motion drive mechanism according to claim 17, said pairs of pole teeth being of equal spacing about the axis of said rotor assembly.

27. A device for providing fixed amplitude reciprocating angular motion according to claim 26, said at least one rotor magnet being equal in number and spacing with said pairs of pole teeth.

28. A device for providing fixed amplitude reciprocating angular motion according to claim 26 said at least one rotor magnet being at least two rotor magnets, the spacing of said rotor magnets configured in conjunction with the spacing of said pairs of pole teeth to limit the arc of rotation of said rotor to a fixed amplitude.

29. A device for providing fixed amplitude reciprocating angular motion according to claim 28, said rotor magnets configured with equal spacing about the axis of said rotor assembly.

30. A device for providing fixed amplitude reciprocating angular motion according to claim 29, said at least two pairs of pole teeth being sixteen pairs of pole teeth.

31. A galvanometer scanner with fixed amplitude reciprocating angular motion drive mechanism, comprising
 a bi-directional rotary drive motor and scanner mirror, and
 a stator assembly configured with at least one stator magnet coupled with at least one pair of upper and lower inwardly extending pole teeth, said pole teeth configured for concentrating magnetic circuit flux lines induced by said magnet in a common direction between respective upper and lower teeth of each said pair, said stator attached to the housing of said motor, and
 a rotor assembly sized and configured for rotation within said stator assembly between said upper and lower pole teeth, said rotor assembly comprising a corresponding at least one rotor magnet peripherally configured on said rotor with poles oriented in opposition to said magnetic circuit flux lines of said stator so as to have the free rotation of said rotor magnetically opposed by intersection of said magnet with opposing said flux lines of said stator, said rotor being attached to the output shaft of said motor and to said scanner mirror.

32. A fixed amplitude reciprocating angular motion drive mechanism according to claim 31, said at least one pair of pole teeth being at least two pairs of pole teeth, the location and spacing of said pairs about the axis of said rotor configured in conjunction with the location and spacing of said at least one rotor magnet to limit the arc of rotation of said rotor to a fixed amplitude.

33. A device for providing fixed amplitude reciprocating angular motion according to claim 26, said stator magnet comprising a ring magnet within which said rotor assembly operates, said at least one pair of upper and lower inwardly extending pole teeth comprising upper and lower pole pieces magnetically coupled to said ring magnet, said upper and lower pole teeth extending radially inward from respective said pole pieces.

34. A device for providing fixed amplitude reciprocating angular motion according to claim 26, said at least one rotor magnet being wedge shaped.

35. A device for providing fixed amplitude reciprocating angular motion according to claim 34, said at least one rotor magnet embedded in a nonconductive, nonmagnetic rotor core material.

36. A device for providing fixed amplitude reciprocating angular motion to a bi-directional rotary drive mechanism and load, comprising
 a stator assembly configured with at least one stator magnet coupled with a multiplicity of upper and lower outwardly extending pole teeth, said pole teeth configured for concentrating magnetic circuit flux lines induced by said magnet in a common direction between respective upper and lower teeth of each said pair, a rotor assembly sized and configured for rotation around said stator assembly between said upper and lower pole teeth, said rotor assembly comprising a corresponding multiplicity of rotor magnets configured on said rotor with poles oriented in opposition to said magnetic circuit flux lines of said stator so as to have the free rotation of said rotor magnetically opposed by intersection of said rotor magnets with opposing said flux lines of said stator.

37. A device for providing fixed amplitude reciprocating angular motion according to claim 36, said rotor magnets embedded in a nonconductive, nonmagnetic material.

38. A device for providing fixed amplitude reciprocating angular motion according to claim 36, said stator assembly fixed with respect to the stationary reference frame of a said drive mechanism, said rotor assembly being attached to the rotary component of said drive mechanism.

39. A device for providing fixed amplitude reciprocating angular motion according to claim 36, said rotor assembly attached to a position detect or for determining angular position.

40. A device for providing fixed amplitude reciprocating angular motion according to claim 39, said drive mechanism being a galvanometer, said rotor assembly attached to a load, said load being at least one mirror.

* * * * *

UNITED STATES PATENT AND TRADEMARK OFFICE
CERTIFICATE OF CORRECTION

PATENT NO. : 6,448,673 B1
DATED : September 10, 2002
INVENTOR(S) : David C. Brown, Michael B. Nussbaum and Felix Stukalin It is certified that error appears in the above-identified patent and that said Letters Patent is hereby corrected as shown below:

<u>Column 1,</u>
Line 37, delete "iK2", insert -- iKt --
Line 39, delete "K2", insert -- Kt --

<u>Column 10,</u>
Lines 49 and 57, delete "26", insert -- 31 --

Signed and Sealed this

Twenty-third Day of December, 2003

JAMES E. ROGAN
*Director of the United States Patent and Trademark Office*